(12) United States Patent
Desai

(10) Patent No.: US 11,539,156 B1
(45) Date of Patent: Dec. 27, 2022

(54) FLIP COVER ASSEMBLY FOR AN ELECTRICAL PLUG-RECEPTACLE PAIR

(71) Applicant: APPLETON GRP LLC, Rosemont, IL (US)

(72) Inventor: Suraj N. Desai, Moshi (IN)

(73) Assignee: Appleton Grp LLC, Rosemont, IL (US)

( * ) Notice: Subject to any disclaimer, the term of this patent is extended or adjusted under 35 U.S.C. 154(b) by 15 days.

(21) Appl. No.: 17/356,422

(22) Filed: Jun. 23, 2021

(51) Int. Cl.
*H01R 13/447* (2006.01)

(52) U.S. Cl.
CPC .................................. *H01R 13/447* (2013.01)

(58) Field of Classification Search
CPC .................................................... H01R 13/447
See application file for complete search history.

(56) References Cited

U.S. PATENT DOCUMENTS

| 5,779,083 | A | | 7/1998 | Bordwell | |
|---|---|---|---|---|---|
| 6,041,155 | A | * | 3/2000 | Anderson | G02B 6/3825 385/139 |
| 6,554,150 | B2 | * | 4/2003 | Foltz | B60K 15/05 220/255 |
| 8,991,645 | B2 | * | 3/2015 | Hachadorian | H01R 13/447 220/827 |
| 9,337,593 | B2 | * | 5/2016 | Curtis | H01R 24/28 |
| 11,177,584 | B1 | * | 11/2021 | Pearman | H01R 13/627 |
| 2021/0265764 | A1 | * | 8/2021 | Hachadorian | H01R 13/5213 |

FOREIGN PATENT DOCUMENTS

| DE | 102012103550 A1 | * | 10/2013 | ........... H01R 13/506 |
|---|---|---|---|---|
| DE | 102007012659 B4 | | 6/2015 | |
| JP | 2006515710 A | | 6/2006 | |

OTHER PUBLICATIONS

Indian Examination Report Under Sections 12 & 13 of the Patents Act, 1970 and the Patents Rules, 2003, Application No. 201921039801, dated Jun. 1, 2021, 6 pages.

* cited by examiner

*Primary Examiner* — Tho D Ta
(74) *Attorney, Agent, or Firm* — McDonnell Boehnen Hulbert & Berghoff LLP

(57) ABSTRACT

The present disclosure envisages a flip cover assembly for an electrical plug-receptacle pair (210-210). The flip cover assembly comprises a flip cover (230), a first coupling element (234) and a second coupling element (240). The first coupling element (234) is formed integral with the flip cover (230). The second coupling element (234) is formed integral with the receptacle (220). The flip cover (230) is hinged to the receptacle by coupling the first coupling element (234) and the second coupling element (240). A cam (238) is configured on the first coupling element (234) to provide a moment of resistance to the rotation of the flip cover (230) from an open state to a closed state and thereby to prevent immediate closing of the flip cover (230). The flip cover assembly of the present disclosure facilitates convenient insertion of a plug in a corresponding receptacle.

14 Claims, 7 Drawing Sheets

FLIP COVER ASSEMBLY FOR AN ELECTRICAL PLUG-RECEPTACLE PAIR

FIELD

The present disclosure relates to electrical plugs and receptacles.

BACKGROUND

The background information herein below relates to the present disclosure but is not necessarily prior art.

Flip covers for receptacles of an electrical plug-receptacle pair are hingeably attached at the entry portion. On opening a flip cover, a plug is allowed to engage and establish electrical connection within the receptacle. Usually, the plug is configured at the end of a cable. The receptacle may be fixedly mounted on a wall or may be configured at an end of a cable. Flip covers protect the electrical terminals of the receptacles from entry of water and dust when the receptacles are not in use.

While engaging the plug with the receptacle, the flip cover needs to be lifted upwards by one hand and the other hand is engaged in insertion of the mating plug. This method involves use of both hands for the operation thus making it difficult to insert the plug using one hand as the other hand is engaged in holding the flip cover upwards to prevent the cover from hindering the insertion of the plug into the receptacle. Also, alignment of electrical terminals becomes difficult in case of heavier plugs.

Hence, there is a need of a flip cover for a receptacle in an electrical plug-receptacle pair which ameliorates the aforementioned issues.

OBJECTS

Some of the objects of the present disclosure, which at least one embodiment satisfies, are as follows:

An object of the present disclosure is to provide a flip cover assembly for an electrical plug-receptacle pair.

Another object of the present disclosure is to provide a flip cover assembly for an electrical plug-receptacle pair, which facilitates ease of insertion of the plug in the receptacle.

Yet another object of the present disclosure is to provide a flip cover assembly for an electrical plug-receptacle pair which is easy to manufacture.

Other objects and advantages of the present disclosure will be more apparent from the following description, which is not intended to limit the scope of the present disclosure.

SUMMARY

The present disclosure envisages a flip cover assembly for an electrical plug-receptacle pair. The flip cover assembly comprises a flip cover, at least one first coupling element and at least one second coupling element. The flip cover is configured to cover the receptacle. The first coupling element is formed integral with the flip cover. The second coupling element is formed integral with the receptacle. The flip cover is hinged to the receptacle by coupling the first coupling element and the second coupling element. A cam is configured on the first coupling element to provide a moment of resistance to the rotation of the flip cover from an open state to a closed state and thereby to prevent immediate closing of the flip cover.

In an embodiment, the magnitude of the moment of resistance is greater than the total closing moment exerted on the flip cover.

In an embodiment, a torsional spring is configured to exert a closing moment on the flip cover. In another embodiment, the flip cover is positioned on the receptacle such that the weight of the flip cover exerts a closing moment on the flip cover.

In an embodiment, a pin is configured to couple the first coupling element and the second coupling element. In an embodiment, the first coupling element has a through-hole having a major axis larger than the diameter of the pin and the second coupling element has a through-hole having a diameter equal to, or slightly smaller than, the diameter of the pin.

In an embodiment, the moment of resistance is due to toggling of the cam when the cover is opened.

In another embodiment, the moment of resistance is a moment due to friction between the cam and an external surface of the receptacle generated when the flip cover opens or closes.

In an embodiment, the magnitude of the moment of resistance is less than the total closing moment exerted on the flip cover.

In an embodiment, the first coupling element is a knuckle and the second coupling element is a lobe. In another embodiment, the first coupling element is a lobe and the second coupling element is a knuckle.

BRIEF DESCRIPTION OF ACCOMPANYING DRAWING

Figure 3:
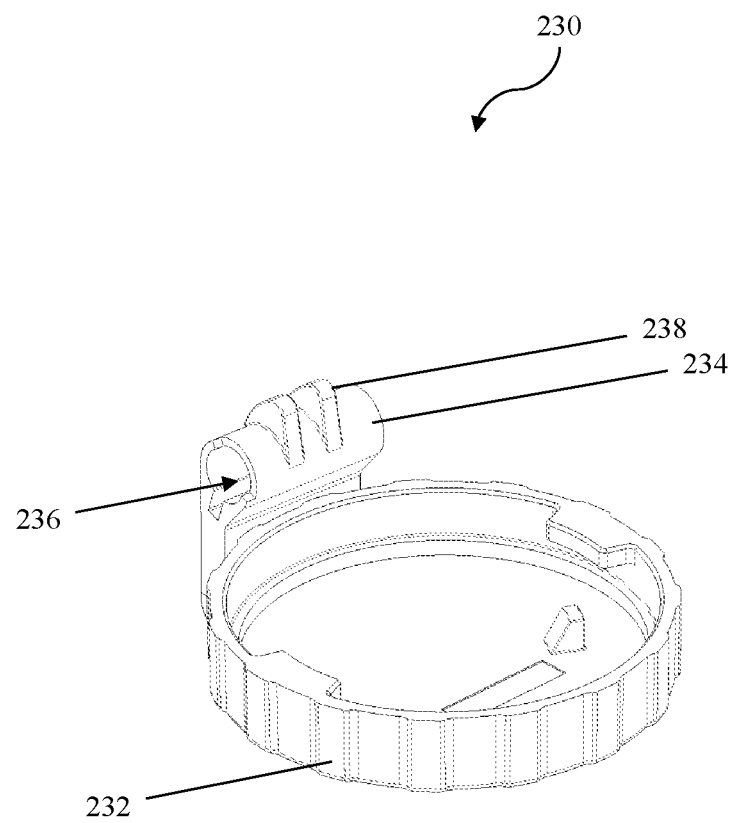
FIG. 3 illustrates a flip cover according to an embodiment of the present disclosure.
Figure 4A:
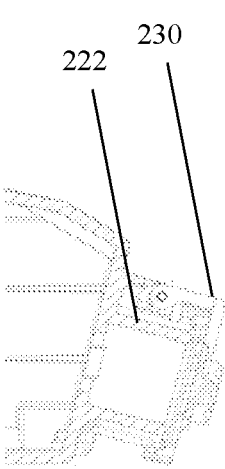
Figure 4B:
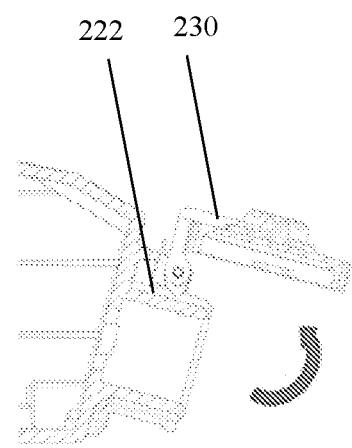
Figure 4C:
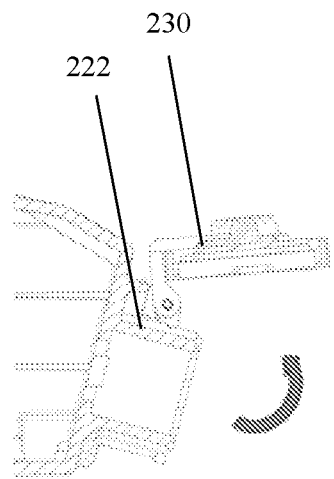
Figure 4D:
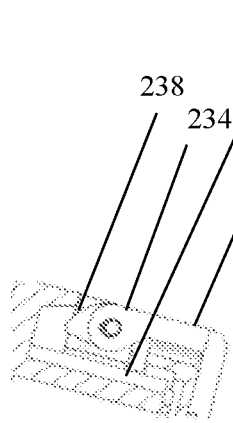
Figure 4E:
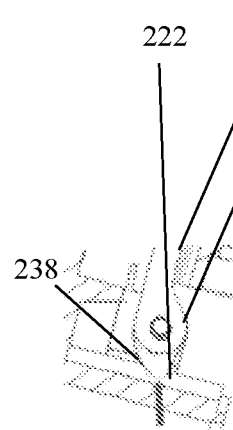
Figure 4F:
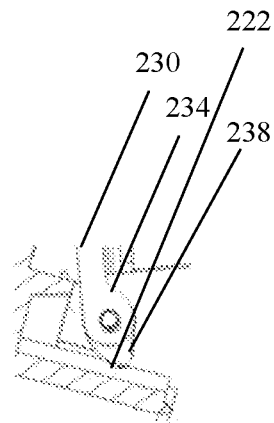
Figures 5A, 5B:
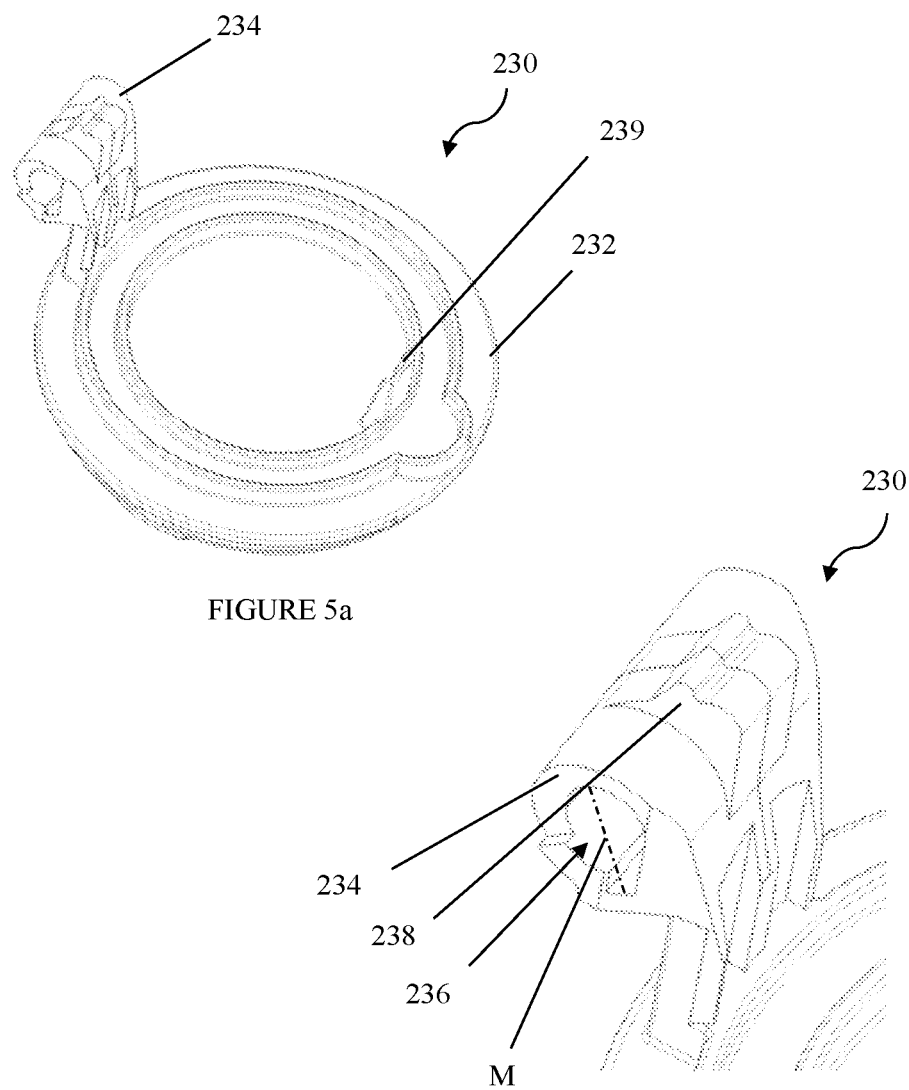
Figure 6A:
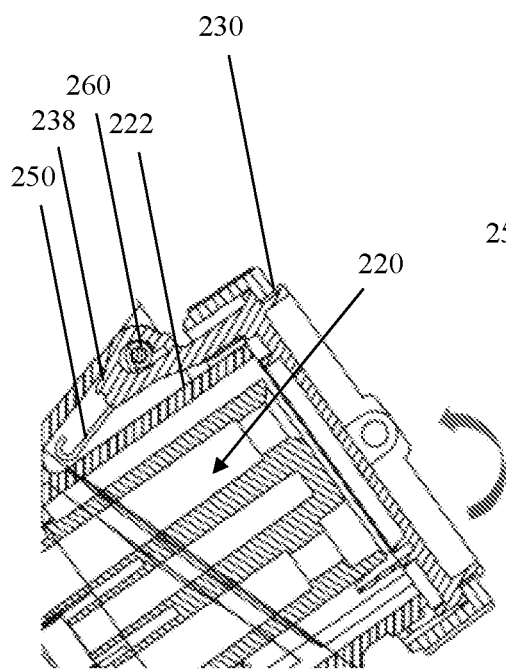
Figure 6B:
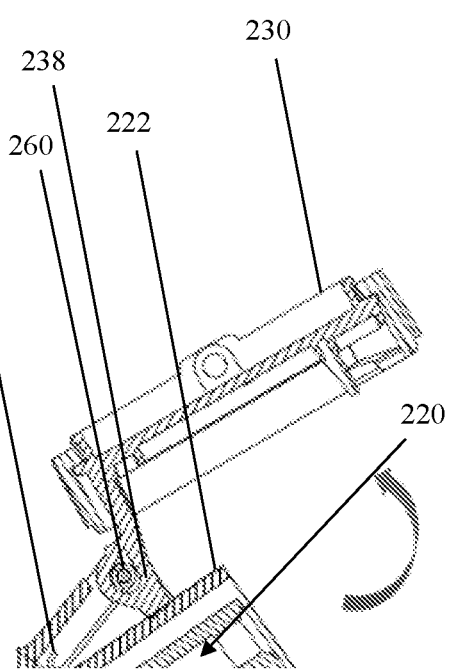
Figure 7:
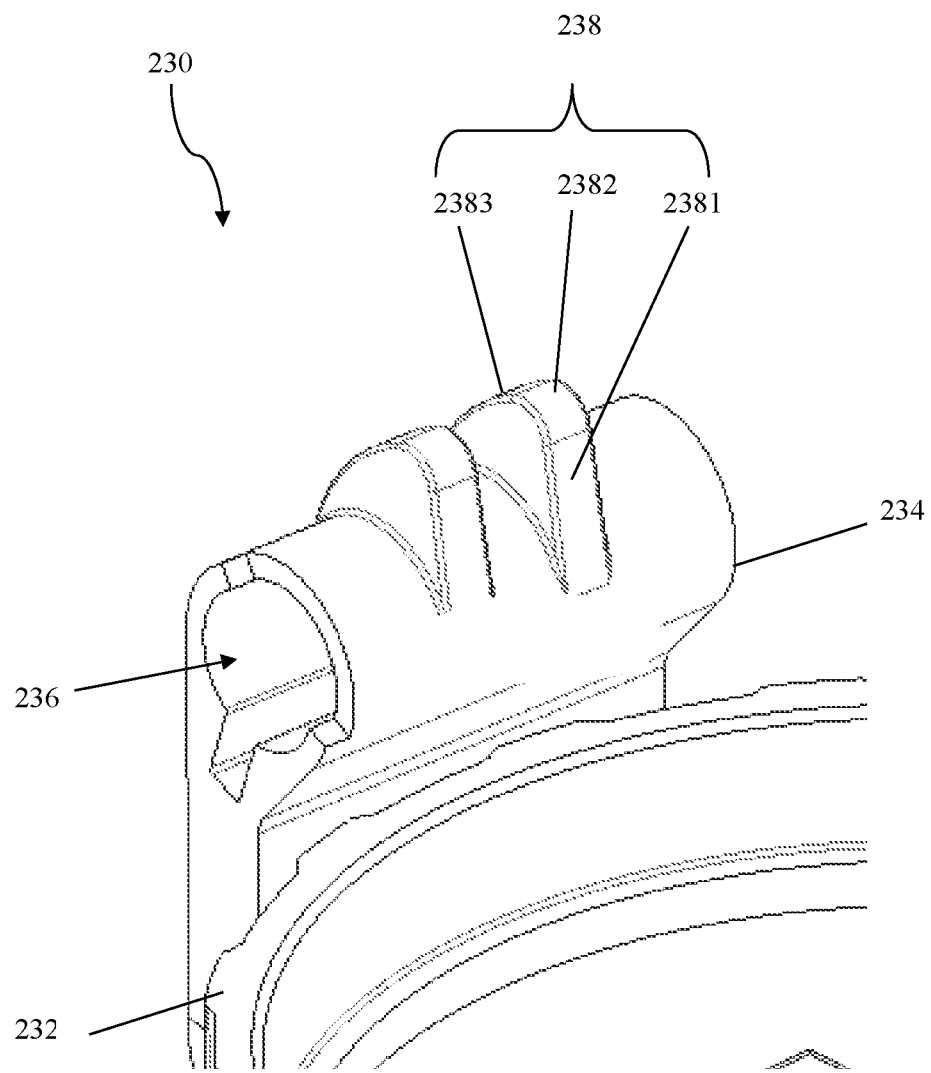

FIGS. 4*a*-4*f* illustrate stages of operation of a flip cover of the present disclosure;

FIGS. 5*a*-5*b* illustrate a flip cover according to an embodiment of the present disclosure in an open and a closed state;

FIGS. 6*a*-6*b* illustrate a flip cover according to another embodiment of the present disclosure; and FIG. 7 illustrates a close-up view of the cams of FIG. 3.

LIST OF REFERENCE NUMERALS

100 electrical plug receptacle assembly of prior art
120 receptacle of prior art
130 flip cover of prior art
135 tool
200 electrical plug-receptacle assembly of the present disclosure
210 plug
212 rear circumferential edge
220 receptacle
222 external surface of receptacle
230 flip cover
232 cover element
234 first coupling element
236 first through-hole
M major axis of first through-hole
238 cam
2381 operative inner side wall of cam
2382 operative top surface of cam 2383 operative outer side wall of cam
239 stopper pin
240 second coupling element
242 second through-hole
250 torsional spring
260 pin
270 protrusion

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a", "an" and "the" may be intended to include the plural forms as well, unless the context clearly suggests otherwise. The terms "comprises", "comprising", "including" and "having" are open-ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

When an element is referred to as being "mounted on", "engaged to", "connected to" or "coupled to" another element, it may be directly on, engaged, connected or coupled to the other element. As used herein, the term "and/or" includes any and all combinations of one or more of the associated listed elements.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

Terms such as "inner", "outer", "beneath", "below", "lower", "above", "upper" and the like, may be used in the present disclosure to describe relationships between different elements as depicted from the figures.

Figure 1:
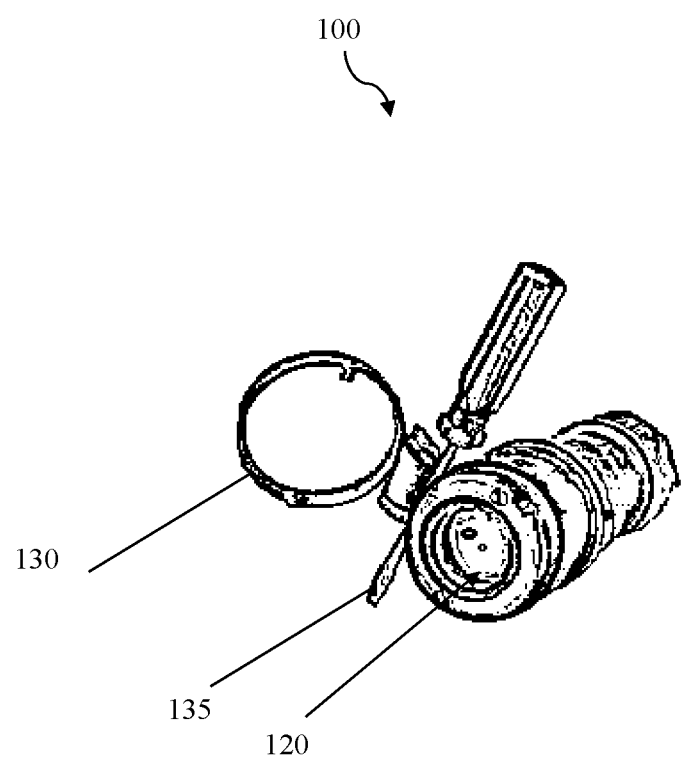
FIG. 1 illustrates a flip cover for a receptacle in an electrical plug-receptacle pair of a prior art.

A conventional flip cover 130 is hingeably attached to a receptacle 120 of an electrical plug-receptacle pair, the receptacle 120 being as illustrated in FIG. 1 of prior art. The flip cover 130 is either configured to revert back to the closed position due to its own weight or is spring-loaded so as to be biased towards the closed position, or both the weight of the flip cover 130 and the bias due to a torsional spring exert a closing moment on the flip cover 130 simultaneously. The flip cover 130 needs to be held with one hand in an open position or an object 135 of a suitable shape can be placed between the knuckle of the hinge and the receptacle's edge to prevent the cover 130 from closing back on the opening of the receptacle 120 while the plug (not illustrated in FIG. 1) is being inserted. Holding the flip cover 130 open with one hand is inconvenient, especially when the plug and the connected chord have significant weight. Hence, there is a need for a flip cover for an electrical plug-receptor pair which retains its positions, at least while the plug is inserted into the receptacle.

Figure 2:
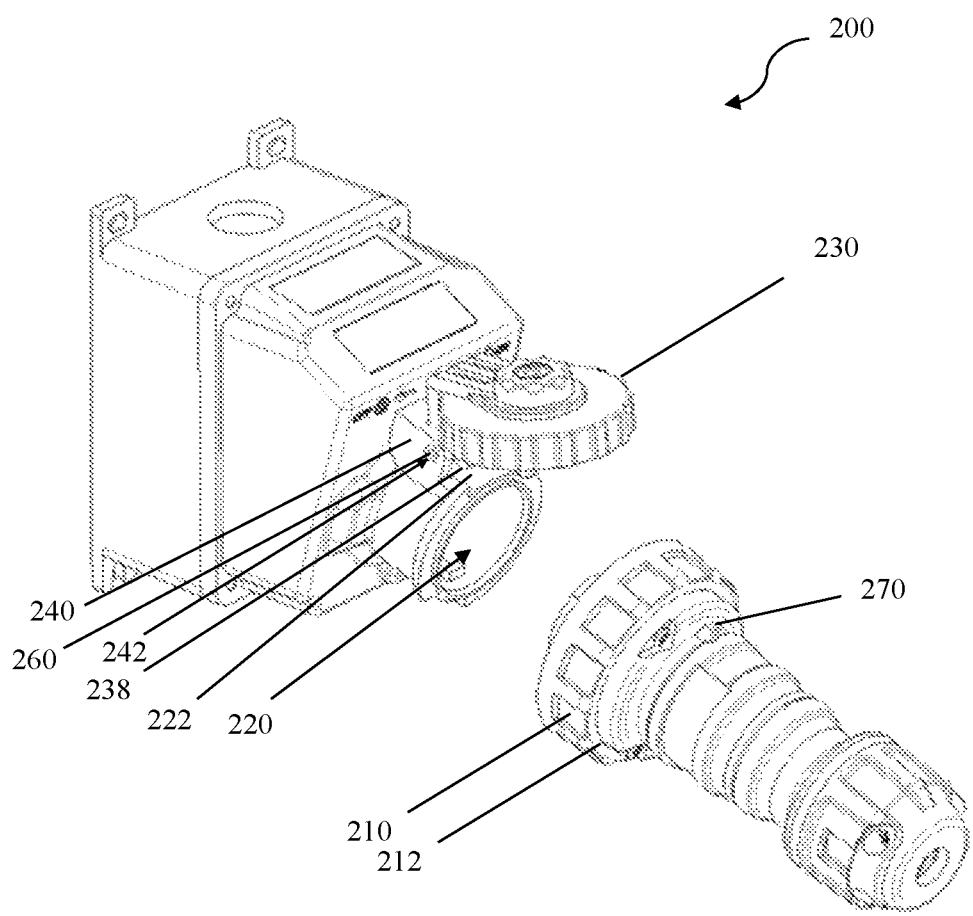
FIG. 2 illustrates an electrical plug-receptacle pair of the present disclosure.

The present disclosure envisages a flip cover assembly for an electrical plug-receptacle pair 210-220, as illustrated in FIG. 2. The flip cover assembly comprises a flip cover 230, at least one first coupling element 234 formed integral with the flip cover 230 and at least one second coupling element 240 formed integral with the receptacle 220. The flip cover 230 is configured to cover the receptacle 220. The flip cover 230 is hinged to the receptacle 220 by coupling the first coupling element 234 and the second coupling element 240. According to an aspect of the present disclosure, at least one cam 238 is configured on the first coupling element 234 to provide a moment of resistance to the rotation of the flip cover 230 from an open state to a closed state and thereby prevent immediate closing of the flip cover 230.

In an embodiment, a knuckle 234 functioning as the first coupling element 234 is formed integral with the flip cover 230, and the knuckle has a first through-hole 236. The rim of the receptacle 220 has a pair of lobes 240 integral therewith functioning as the second coupling elements 240, each lobe 240 having a second through-hole 242. A pin 260 is configured to be inserted through the lobes 240 and through the knuckle 234 and is locked at the one end to form the hinge joint, so as to couple the knuckle 234 and the lobes 240. The cross-sectional shape of the first through-hole 236 of the knuckle 234 has a major axis 'M' as illustrated in FIG. 5b. The major axis 'M' of the through-hole 236 is larger than the diameter of the pin 260 and the second through-hole 242 of each of the lobe has a diameter equal to, or slightly smaller than, the diameter of the pin 260. The angular position of the peak of the cam 238 is substantially perpendicular to the plane of the flip cover 230. The cam 238 is defined by an operative inner side wall 2381, an operative top surface 2382 and an operative outer side wall 2383 as illustrated in FIG. 7. A torsional spring 250 is configured to bias the flip cover 230 towards the closed state.

In another embodiment of the electrical plug-receptacle pair of the present disclosure (not illustrated in Figures), the rim of the receptacle has a knuckle which is integral to the receptacle and functions as the first coupling element, and the knuckle has a second through-hole. A plurality of lobes, each having a first through-hole, is integral with the flip cover and the lobes function as the second coupling elements. Each lobe of the flip cover is shaped in the form of a cam. A pin is configured to be inserted through the knuckle and through the lobes and locked at the one end to form the hinge joint. The cross-sectional shape of the first through-holes of the lobes has a major axis. The rest of the construction of the flip cover is configured to be similar to the previous embodiment. For the sake of brevity, the same is not explained here.

The flip cover 230 is either configured to fall back in the closed position due to its own weight or is biased towards the closed position by a torsional spring 250, or both the weight of the flip cover 230 and the bias due to the torsional spring 250 exert a closing moment on the flip cover 230 simultaneously. In the closed state of the flip cover 230, no surface of the cam 238 comes into contact with the outer surface of the receptacle 220. As the flip cover 230 is lifted from its closed state against the biasing force of the spring 250 and/or against the weight of the flip cover 230, the transition area on the surface of the cam 238 between the operative inner side wall 2381 and the operative top surface 2382 of the cam 238 comes into rolling contact with the external surface of the receptacle 220. By applying additional moment, the moment of resistance to rotation of the flip cover 230 imparted by the cam 238 is overcome. As a result, the first coupling element 234 and thereby the flip cover 230 is displaced along the major axis 'M' of the first through-hole 236 of the first coupling element 234. The pin 260 is held in position within the second through-holes 242 of the second coupling element 240 while the extension of the first through-hole 236 in the first coupling element 234 slides over the pin 260, thus permitting the displacement of the flip cover 230. On further rotation of the flip cover 230, the cam 238 rolls while the transition area on the surface of the cam 238 between the operative top surface 2382 and the operative outer side wall 2383 of the cam 238 comes in rolling contact with the external surface 222 of the receptacle 220, or beyond. In this state, the torsion exerted by the torsional spring 250 is not sufficient to rotate the flip cover 230 back to its closed state. The moment of resistance is due to toggling of the cam 238 when the flip cover 230 is opened. The moment of resistance about the axis of rotation of the pin 260, due to the resistance force acting upon the cam 238 by the external surface 222 of the receptacle 220, is greater than the biasing moment that is exerted by the torsional spring 250 towards the direction of closing. Thus, the flip cover 230 remains in the open state, unless an external moment is applied to overcome the resistance moment to rotation generated due to the cam 238.

In an embodiment, the operative top surface of the cam 238 has a single convex arcuate profile, as illustrated in FIG. 3. In another embodiment, the operative top surface of the cam 238 has an operative inner convex profile and an operative outer convex profile, with a valley therebetween, as illustrated in FIG. 5. In yet another embodiment, the operative top surface of the cam 238 has a flat profile with rounded edges (not illustrated in Figures). In still another embodiment, the surface of the operative top cam 238 is textured to generate friction with the external surface 222 of the receptacle 220, thereby providing opposition to the closing of the flip cover 230.

In another embodiment, the cam 238 which is formed integral to the flip cover 230 has an external surface which comes into frictional contact with the external surface 222 of the receptacle 220, as the flip cover 230 is opened. An additional moment is required to open the flip cover 230 for overcoming the frictional resistance moment, apart from the moment required to overcome the closing moment that exists due to the bias of the torsional spring 250 and/or, in an embodiment, due to the moment due to the weight of the flip cover 230 acting in the closing direction. In this embodiment, the frictional resistance acting opposite to the closing direction causes the flip cover 230 to close gradually. The time delay required for the flip cover 230 to close without applying any external force is determined by the coefficient of friction of the frictional contact between the external surface of the cam 238 and the external surface of the receptacle 220. Thus, the coefficient of friction between the external surface 222 of the cam 238 and the external surface of the receptacle 220 is predetermined in order to have a time delay enough to allow sufficient time for proper insertion of the plug 210 without any hindrance by the closing of the flip cover 230.

In an embodiment, the flip cover 230 has a stopper pin 239 shown in FIG. 5a that rests against the electrical cord that is coupled to the plug 210, as the flip cover 230 closes while the plug 210 is inserted in the receptacle. By locking against a protrusion 270 of the plug 210 which is shown in FIG. 2, the stopper pin 239 prevents disconnection of the plug 210 from the receptacle 220.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

TECHNICAL ADVANCEMENTS

The present disclosure described herein above has several technical advantages including, but not limited to, the realization of flip cover assembly for an electrical plug-receptacle pair, which:

facilitates ease of insertion of the plug in the receptacle; and is easy to manufacture.

The foregoing disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

I claim:

1. A flip cover assembly for an electrical plug-receptacle pair (210-220), said flip cover assembly comprising:
   a flip cover (230) configured to cover the receptacle (220);
   at least one first coupling element (234) formed integral with the flip cover (230);
   at least one second coupling element (240) formed integral with the receptacle (220), wherein the flip cover (230) is hinged to the receptacle (220) by coupling said first coupling element (234) and said second coupling element (240); and
   at least one cam (238) configured on said first coupling element (234) to provide a moment of resistance to the rotation of the flip cover (230) from an open state to a closed state and thereby to prevent immediate closing of the flip cover (230);
   wherein the at least one cam (238) has an outer end that engages an external surface (222) of receptacle (220) upon movement of flip cover (230) to the open state.

2. The flip cover assembly as claimed in claim 1, wherein the magnitude of said moment of resistance is greater than the total closing moment exerted on the flip cover (230).

3. The flip cover assembly as claimed in claim 1, wherein the flip cover (230) is positioned with respect to the receptacle (220) such that the weight of the flip cover (230) exerts a closing moment on the flip cover (230).

4. The flip cover assembly as claimed in claim 1, wherein said moment of resistance is due to toggling of said cam (238) when the flip cover (230) is opened.

5. The flip cover assembly as claimed in claim 1, wherein said first coupling element (234) is a knuckle and said second coupling element (240) is a lobe.

6. The flip cover assembly as claimed in claim 1, wherein said first coupling element (234) is a lobe and said second coupling element (240) is a knuckle.

7. The flip cover assembly as claimed in claim 1, wherein the at least one cam (238) is formed integral with the first coupling element (234) of flip cover (230).

8. The flip cover assembly as claimed in claim 1, wherein the at least one cam (238) includes a plurality of extensions that extend outwardly from a round surface of the first coupling element (234) of flip cover (230).

9. The flip cover assembly as claimed in claim 1, wherein a torsional spring (250) extends from a pin (260) within the first coupling element (234) and the torsional spring (250) exerts a force against an external surface (222) of receptacle (220) upon movement of flip cover (230) into the open state.

10. The flip cover assembly as claimed in claim 1, wherein a pin (260) is configured to couple said first coupling element (234) and said second coupling element (240).

11. The flip cover assembly as claimed in claim 10, wherein said first coupling element (234) has a first through-hole (236) having a major axis (M) larger than the diameter of said pin (260) and said second coupling element (240) has a second through-hole (242) having a diameter equal to the diameter of said pin (260).

12. The flip cover assembly as claimed in claim 1, wherein said moment of resistance is a moment due to at least in part to friction between said cam (238) and an external surface (222) of the receptacle (220) generated when the flip cover (230) opens or closes.

13. The flip cover assembly as claimed in claim 12, wherein the magnitude of said moment of resistance is less than the total closing moment exerted on the flip cover (230).

14. A flip cover assembly for an electrical plug-receptacle pair (210-220), said flip cover assembly comprising:
   a flip cover (230) configured to cover the receptacle (220);
   at least one first coupling element (234) formed integral with the flip cover (230);
   at least one second coupling element (240) formed integral with the receptacle (220), wherein the flip cover (230) is hinged to the receptacle (220) by coupling said first coupling element (234) and said second coupling element (240); and
   at least one cam (238) configured on said first coupling element (234) to provide a moment of resistance to the rotation of the flip cover (230) from an open state to a closed state and thereby to prevent immediate closing of the flip cover (230);
   wherein a torsional spring (250) is configured to exert a closing moment on the flip cover (230); and
   wherein the torsional spring (250) extends from a pin (260) within the first coupling element (234) and the torsional spring (250) exerts a force against an external surface (222) of receptacle (220) upon movement of flip cover (230) into the open state.

* * * * *